INVENTOR.
BOYD A. WISE
BY
ATTORNEY

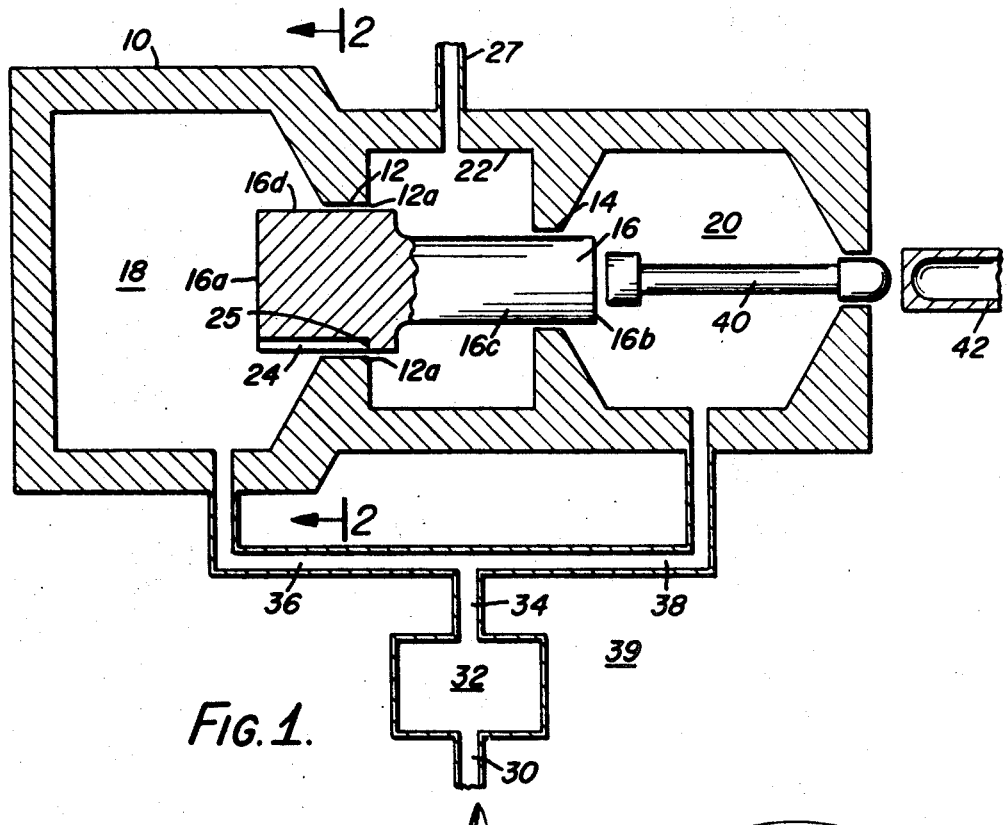
Fig. 1.
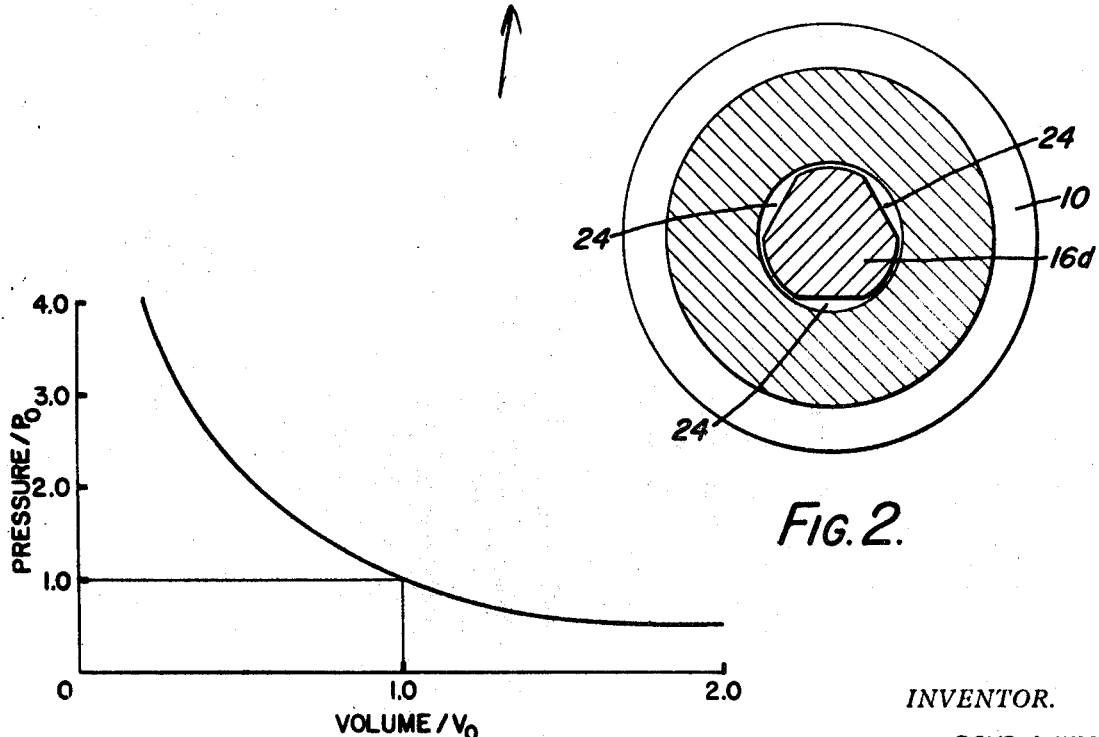
Fig. 2.
Fig. 3.
INVENTOR.
BOYD A. WISE

United States Patent Office 3,605,555
Patented Sept. 20, 1971

3,605,555
PNEUMATIC VIBRATION GENERATOR
Boyd A. Wise, Rochester, N.Y., assignor to
General Dynamics Corporation
Filed Jan. 5, 1970, Ser. No. 668
Int. Cl. F01l *15/02, 21/02;* F01b *7/18*
U.S. Cl. 91—50                                             10 Claims

ABSTRACT OF THE DISCLOSURE

A self-excited pneumatic oscillator is described which includes a reciprocating valve member that is capable of high frequency operation. The valve member is disposed in a housing having a first active spring chamber, and a second spring chamber spaced therefrom. Both spring chambers are charged by a source of pressurized air and act upon opposite ends of the valve member. A discharge chamber is disposed so that it is brought periodically in communication with the first chamber as the valve reciprocates, whereby the oscillator converts the energy of the pressurized fluid flowing from the active chamber to the discharge chamber into self-sustained reciprocating motion of the valve. The oscillator includes a filter between the source of pressurized air and the spring chambers to minimize alternating pressure fluctuations in the air supply line, thereby enhancing efficiency. The filter and valving provide for automatic self-starting followed by a shift to a predetermined valve position for efficient operation at maximum load.

---

Figure 4:
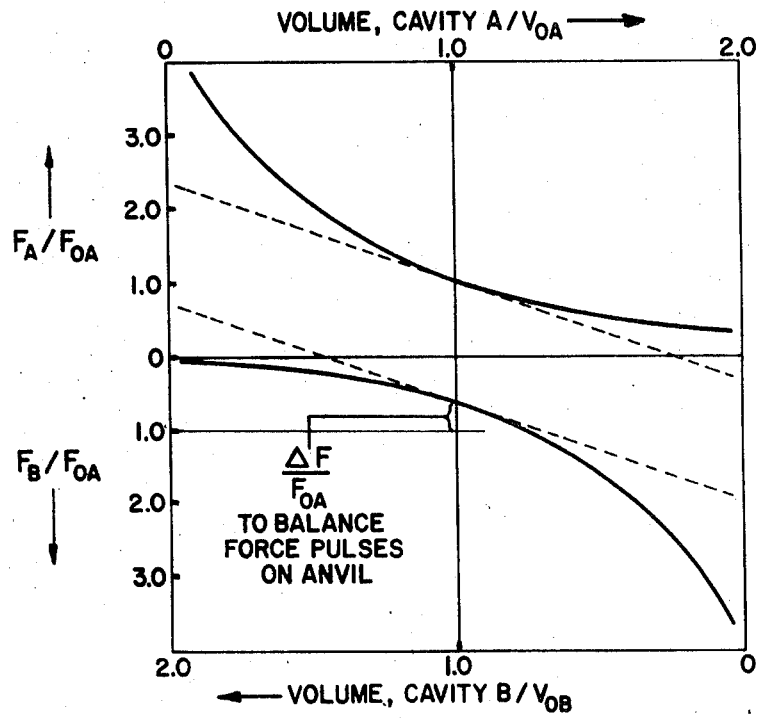

The present invention relates to a self-excited pneumatic oscillator which produces self-sustained acoustic oscillation of an operating member and of the pressurized air which supplies power to the oscillator.

Heretofore, most pneumatic devices having a valve member which is driven in a reciprocal fashion have operated on what is known as a dump-and-fill cycle. In such arrangements, pressurized air charges a chamber driving the piston member axially. Thereafter, the pressurized air is discharged. The return stroke operates in a similar fashion. These devices are limited in frequency because they have inherent inertia problems in starting, accelerating, stopping and reversing the piston member. Further, these devices have an inherent upper frequency limit that is imposed by the supply pressure, the mass of the piston member and the stroke. In practical devices, the supply pressure is often limited to about 100 p.s.i. and the frequency of the strokes to about 20-50 cycles per second. In order to increase the stroke frequency to the order of 100 cycles per second, it is necessary to use a lightweight piston and to decrease the stroke length and the energy per blow. This limits the application of these devices, since there is an upper limit on available combinations of energy and power ratings. In many applications, it has not been feasible to make a high frequency, high energy air operated tool, as would be desired for many applications, such as blast hole drilling.

Accordingly, it is an object of the present invention to provide an improved self-excited pneumatic oscillator capable of high frequency operation at high powers, such that it is, for example, capable of being used in an impact or percussive tool.

A further object of the present invention is to provide an improved pneumatic oscillator which is configured to provide for efficient power transmission from the oscillator to a load.

Briefly described, a pneumatic oscillator embodying the invention includes a self-excited valve member which is restrained to generally a single degree of freedom, and is adapted to provide a hammer element which periodically impacts upon an anvil system. The valve member is disposed in a housing which has an active pneumatic spring chamber coupled to a charging source of pressurized air and a second pneumatic spring chamber coupled to the same source of pressurized air. The oscillator converts the air pressure energy into alternating mechanical energy as pressurized fluid intermittently flows from the active chamber through a stator port in the housing into a discharge chamber during a selected portion of a stroke cycle.

Due to its energy storage ability, the charged air in the chambers acts as a spring and aids in starting, accelerating and reversing the valve member by alternately converting the kinetic energy of the moving valve member to potential energy in the charged air and then reconverting that potential energy to kinetic energy by accelerating the valve in the opposite direction. In a preferred arrangement, the source of pressurized air is supplied to the spring chambers by way of an input filter which helps to reduce alternating pressure vibrations in the air supply line ahead of the input filter, providing acoustic isolation so that energy losses are low in the air supply line.

Figure 5:
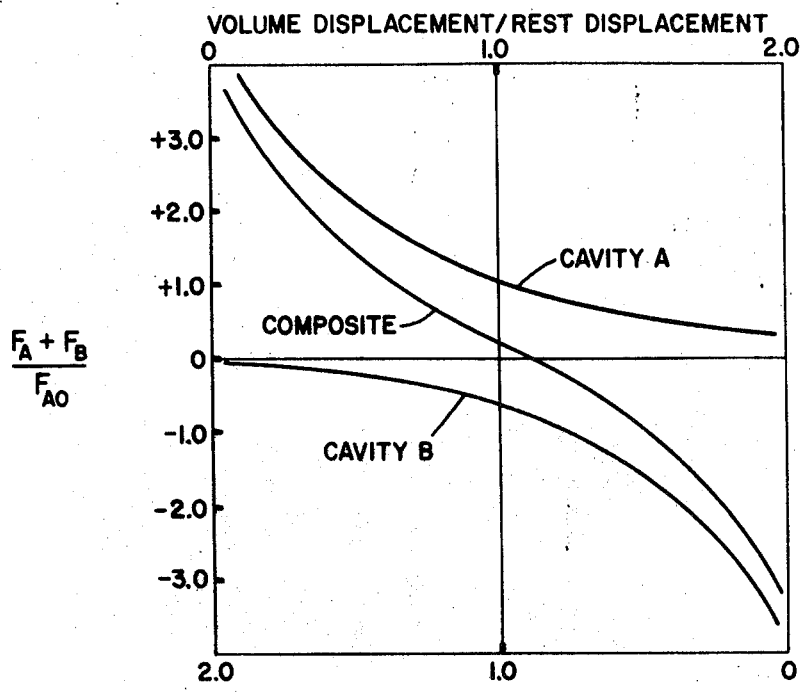

The invention itself, both as to its organization and method of operation, as well as additional objects and advantages thereof, will become more readily apparent from a reading of the following description taken in connection with the accompanying drawing in which FIG. 1 is a schematic longitudinal sectional view of an oscillator and impact tool constructed in accordance with a preferred embodiment of the invention; FIG. 2 is a sectional view along line 2—2; FIGS. 3–5 are curves illustrating the operation of the oscillator; and FIGS. 6–9 are diagramamtic views of the acoustic waves generated in the operation of the oscillator.

Referring to the drawing, a housing 10 is formed with two cylindrical bearing surfaces 12 and 14 which are adapted to guide and support a valve member 16 for oscillation along the longitudinal axis of the housing 10. The member 16 also acts as a hammer as will become apparent as the description proceeds. The housing 10 is formed with an active chamber 18 and a passive chamber 20, with the volume ($V_A$) of the active chamber 18 being somewhat greater than the volume ($V_B$) of the chamber 20. Between the guide surfaces 12 and 14 there is provided a discharge chamber 22 which is connected to a discharge conduit 27.

The valve member 16 is substantially cylindrical in configuration. It has an end surface 16*b*, having a surface area ($S_B$). The end 16*b* and a cylindrical portion 16*c* of the valve is partially disposed in the chamber 20. The central valve portion 16*c* extends through the bearing 14 into the discharge chamber 22 where it merges into a larger cylindrical portion 16*d* terminating at an end surface 16*a* which is disposed in the chamber 18. The end 16*a* has a surface area $S_B$. Near the end surface 16*a* the valve member 16*d* is provided with a cutaway portion or notch 24. By means of this arrangement, when the valve member 16 is in a position where it is moving to the right into the chamber 20, the cutaway portion 24 will move the edge 12*a* of surface 12 and will permit a flow discharge from the active chamber 18 to the discharge chamber 22. When the valve member 16 moves in the opposite direction (to the left) the edge 12*a* will be adjacent to a mating surface of the valve member 16 and no fluid will flow from the active chamber into the discharge chamber. The shoulder 25 of the notch 24 forms a metering edge of the valve for controlling the flow of air, while the surface 12 and its edge 12*a* provide a starter port structure.

Pressurized air is provided to charge the chamber 18 and the chamber 20 by means of a feed line 30 which first is in communication with a supply line chamber 32 and then merges into a line 34 which is dimensioned to be $\lambda/8$ where $\lambda$ is the wave length of the fundamental frequency $f_0$ of the generated acoustic frequency oscillations, also the frequency of oscillation of the valve 16 which has an average value of presure $P_0$. Each of the lines 36 and 38 which respectively lead to the chambers 18 and 20 have a length of $\lambda/4$ at the frequency $f_0$. This arrangement provides an input filter 39 which helps to confine the alternating pressure fluctuations to the chamber 18 and chamber 20 and to the supply line sections that constitute the filter.

The valve member 16 oscillates between the chambers 18 and 20 which act as pneumatic springs. Near the end of the stroke the valve member 16 impacts upon anvil 40 which extracts useful energy from the system and delivers it to a drill steel 42.

If the following relationship can be maintained:

$$\frac{V_A}{V_B} \approx \frac{S_A}{(S_B)}$$

the corresponding average pressures and the corresponding alternating pressures existing in the two chambers 18 and 20 will be made approximately equal, which condition aids the action of the filter already described.

The impact force on the anvil 40 has an average value that determines the desired difference in the two piston areas. Accordingly, the area difference can be found by the following relationship:

$$(S_A - S_B) = F_{AVG}/P_0$$

The penumatic characteristics of the device may be analyzed to show why the device can operate without an input valve and why it is advantageous to operate in this way. In the following discussion, chamber 18 will be referred to as cavity A and chamber 20 as cavity B.

First referring to cavity A: if there were no gas inlet or gas outlet, the pressure-volume curve, as shown in FIG. 3 for cavity A, would be approximately that for a diatomic gas undergoing adiabatic compression and decompression. This can be expressed in a normalized form where all cavity pressures are divided by the presure $P_0$ at the valve rest position and all cavity volumes are divided by the volume $V_0$ at the valve rest position, which is the position shown in FIG. 1.

The same curve could be applied to cavity B, if it were being treated alone. However, since it is desired to construct a composite characteristic, it is necessary to take account of the fact that the valve compresses the air in one cavity as it decompresses the air in the other; that is, the valve displacement in two cavities is equal in magnitude but opposite in sign. Since it is desired to have the same magnitude of pressure variation in each cavity, the ratio of piston area to cavity volume will be made the same in each cavity, accounting for differences in means pressure due to flow.

$$\frac{S_A}{S_B} = \frac{V_A}{V_B} \frac{P_B}{P_A}$$

The next step toward composite characteristic is to convert cavity pressure values to force values. To do this each presure axis must be multiplied by the applicable piston area:

$$F_A = P_A S_A$$
$$F_B = P_B S_B$$

The force axes each may be normalized to the force applied to $S_A$ at the rest position of the piston. The resulting plot of normalized forces as functions of cavity volume is shown in FIG. 4. Now the total force composite characteristic may be obtained by adding the two force characteristics, and is shown in FIG. 5.

So far, neither inlet nor outlet of gas has been discussed. The operation of a hydroacoustic oscillator requires the controlled inlet of gas at high pressure and exhaust at low pressure, so that energy may be extracted from the gas. Reference may be had to U.S. Pat. No. 3,004,512 for a discussion of hydroacoustic oscillators. This requirement will be discussed in two parts: the exhaust cycle and the inlet cycle.

Exhaust cycle: It is desired to exhaust gas during a fraction of a cycle of oscillation when the pressure is low—no more than half and preferably less than one-third of its inlet presure. At low exhaust presures, a substantial fraction of the gas energy will have been converted into kinetic energy of the moving valve. The exhaust function can be provided by opening and closing the valve at selected values of cavity presure (viz., valve position).

The preferred exhaust valving uses the moving valve to uncover the exhaust port (viz., the edge 12a) at the low-pressure end of its stroke, and cover the port during the remainder of the cycle. Because of the shape of the adiabatic compression curve, the valve overlap has a large value by the time high pressure must be sealed.

Some other form of valve may be used, but will tend to be larger, more expensive and less reliable than the porting just described, and will tend to present difficulties in starting.

Inlet cycle: The inlet cycle employed relates both to starting and to admission of supply gas while running. The simplest arrangement that meets all requirements uses no inlet valving at all, but instead uses a "shunt feed" in which the supply line furnishes a substantially constant inlet flow at all times. This requires an effective inlet isolation filter so that the alternating pressure inside the active cavity is not communicated to the supply line.

When a liquid or other fluid is used that has a substantially linear compressibility over the working range of alternating pressure, then an inlet isolation filter can take the form of a quarter-wavelength line terminated by an element having a low acoustic impedance at the frequency of oscillation. However, two difficulties immediately arise when the operating fluid is a gas. The first is that the nonlinear compressibility of the gas gives rise to a non-sinusoidal variation of gas pressure and the second is that there is no passive physical element that has a low specific acoustic impedance compared with gas (i.e., there are no high-pressure vacuums). A tuned element such as a Helmholtz resonator can be effective in only a narrow frequency range and cannot present a low impedance to the fundamental, the second harmonic and other hormonic frequencies. Thus, something more is needed to provide an isolation filter.

The difficulties cited above are solved in the present invention by providing for cancellation of all even-order harmonics in the input filter 39. The means employed also tend to linearize the cavity stiffness at the fundamental frequency of operation, which is beneficial in extending the pressure range over which the device may be operated.

The chief mechanism employed in the present invention is connecting the two cavities together through a line that is a half-wavelength long at the fundamental frequency of oscillation (i.e., the lines 36 and 38 together), together with the proportioning of the two cavities and the end areas $S_A$ and $S_B$ in them so that equal alternating pressures are generated in the two cavities A and B.

Figure 6:
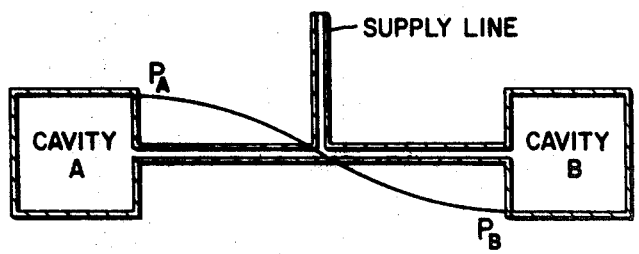
Figure 7:
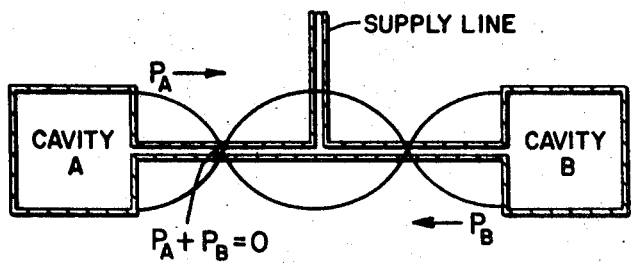

This combination leads to several beneficial effects, since for the fundamental, the connecting line between the two cavities has a node at its midpoint as shown in FIG. 6. At this location, the alternating pressure at the fundamental frequency will have a near-zero value because of the type of symmetry maintained. Pressures that are equal in magnitude but opposite in phase are each connected to the nodal tap for supply gas by equal lines, each producing a 90-degree phase delay and each producing equal attenuation. This ideal situation may be upset slightly by the superposition of steady flow from the supply to the active cavity. If any correction is needed for better cancellation at the node, slight adjustments can be made in the diameter and length of the line 38 from the supply tap to the passive cavity B so as to match the attenuation and phase shift in the two line sections.

The second harmonic is the chief distortion component present in the alternating pressure in the two cavities. For this component the matched line sections and alternating pressures again provide the needed isolation, but by a different mechanism. There is no need to maintain the second harmonic or the higher harmonics in the alternating cavity pressures. Completely removing these components would serve to linearize the stiffness of a cavity. In this case the pressure-displacement characteristic would be a straight line having the slope (stiffness) of the cavity at the piston rest position. The only requirement for this method to be effective is that the connecting line has low attentuation so that substantially all (above about 80 percent) of the harmonic energy transmitted from a cavity to the line be conducted to the opposing cavity without being dissipated (converted to heat). This requirement is easily met by the same line sized to maintain low velocities at the fundamental. Note that it is not required by the invention that harmonic components be completely removed; the degree to which harmonic energy will be transmitted from one cavity to another depends on the ratio of the impedance of the connecting line and the impedance of a cavity at a given frequency.

Since the connecting line will tend to have a constant impedance with frequency and a cavity will tend to have an impedance that is inversely proportional to frequency, a lower proportion of harmonic energy will be transmitted between cavities for the higher harmonics. This is a beneficial effect since the connecting line will be made exactly the right length for the fundamental frequency and will tend to develop a phase error that will increase with frequency. While such errors can be compensated for, if needed, by the use of additional shunt tuning elements, it is better to use an operating pressure range and line size that make a simple, uniform connecting line suffice for all frequency components.

For the second harmonic the line connecting the active and passive cavity will be a full wavelength. Travelling waves will emanate from each cavity and will undergo a full 360-degree phase shift in travelling to the opposite cavity. Since the waves are out of phase with each other at their sources, this full wavelength phase shift will make them out of phase at all locations in the line. The result is substantial cancellation of the two waves everywhere in the line, especially at the center of the line where the supply tap is located. At the center, the attenuation as well as the phase shift will tend to be matched. This arrangement assures that no important amount of harmonic energy will be transmitted down the supply line.

For all higher even harmonics the action of the filter will be the same as for the second harmonic, except for greater values of phase shift and attenuation corresponding to the higher frequencies. As noted, errors in phase at high frequency tend to be compensated for by the decreasing proportion of harmonic energy in these energy components.

Figure 8:
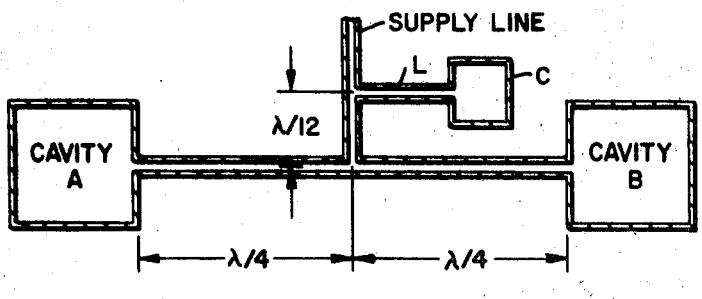

All of the discussion above has centered on the fundamental and even harmonics, which are the main frequency components present. Due to the asymmetry of piston areas in the two cavities as needed for force balance in an impact tool, there are odd harmonics present. These can be rejected from the supply line, if desired, by addition of Helmholtz resonators in the supply line leading to the tap in the filter line as shown in FIG. 8. A rejection filter for the third harmonic is illustrated in FIG. 8. In all cases, wavelengths refer to the fundamental frequency, so that, for instance, the λ/12 section is a quarter wavelength at the third harmonic. The elements labeled L and C will be combined to form a Helmholtz resonator at the third harmonic frequency. They will present a low-impedance termination of the quarter-wavelength line between the resonator and the supply tap, and will thus form a rejection filter for the third harmonic. Any higher-frequency component can be rejected by a similar filter following this one; it should not be necessary, however, if the operating pressure range has been properly selected.

The oscillator just discussed provides for self-starting in the following manner:

The condition required for starting is that the valve be brought close to an edge-to-edge position with the exhaust port (viz., the shoulder 25 and the edge 12a are aligned) in which position the noise and turbulence of gas flowing into the exhaust chamber will start oscillation at the resonant frequency. It is necessary that the oscillator meet the usual criteria of providing sufficient gain and feedback to sustain oscillation.

The valve position will be brought back to the edge-to-edge position from either direction of displacement away from this position:

Should the valve be in a highly overlapped position, no flow would occur from or to either cavity and pressure on the larger area $S_A$ of the valve end 16a in the active chamber 18 would force the valve toward, and slightly past the edge-to-edge position so that the valve forces would be balanced.

Should, instead, the valve be open, the supply pressure would appear in the closed passive cavity 20 and not the open active cavity 18; thus, forcing the valve toward the desired edge-to-edge condition.

The sequence just described is of considerable importance in defining an advantage of the present invention over an otherwise similar oscillator that uses an inlet valve and that, therefore, does not have continuous communication of the supply line pressure with the valve.

Figure 9:
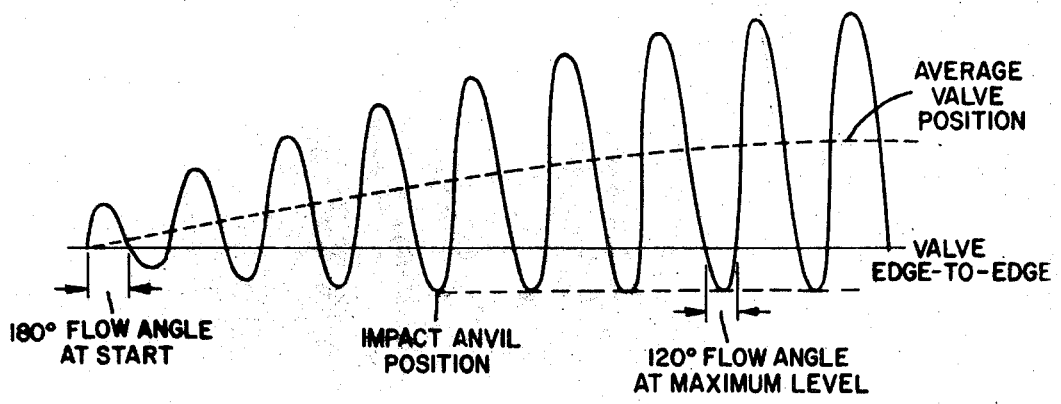

A still further advantage of the present invention relates to the valve position shift that occurs immediately after starting as shown in FIG. 9, the amplitude of oscillation will increase so that the flow through the exhaust ports is chopped, being first cut off and then cut on. The pressure in the active cavity 18 will increase toward the supply pressure, which already exists in the passive cavity 20. As the amplitude increases, the average valve position will be forced away from the edge-to-edge position toward a new position in which the valve is closed during most of the cycle and open only during the time needed to exhaust the inlet gas flow. The resulting equilibrium position will be highly desirable because it will result in substantial expansion of the inlet gas before it is exhausted and because the average pressure in the active cavity will be equal to the supply pressure. In a prior device that uses an inlet valve controlled by the movement of its piston, the average pressure will be about half of the supply pressure and considerably less expansion of the inlet gas will occur before it is exhausted. For equal compression ratios and cavity sizes, the present invention will have about twice the energy storage capability. This would tend to permit higher impact energy or a smaller device for the same impact energy.

It will be appreciated that the foregoing operational theory of the illustrated oscillator has been given by way of explanation and should not be taken to limit the invention to any theory of operation. Variation in structure, within the scope of the invention may become apparent to those skilled in the art, thus, the foregoing description should be taken as illustrative and not in any limiting sense.

What is claimed is:

1. A self-excited pneumatic oscillator comprising
   (a) a housing defining a first active spring chamber and a second spring chamber, a discharge chamber and a stator port region disposed to provide communication between the first chamber and the discharge chamber,
   (b) means for supplying pressurized air for continuously charging said first and second chambers with pressurized air, (c) a valve member extending through said discharge chamber having a first surface disposed in the first chamber and a second surface disposed in the second chamber, (d) a stator port structure between said first chamber and said discharge chamber, (e) the valve member being movable between a first position whereby it is configured to partially uncover said stator port whenever the valve is lower than a certain edge-to-edge position and to cover said stator port whenever the valve is above the edge-to-edge position, and (f) the first and second chambers and valve member being configured to define an acoustic circuit for supporting self-excited oscillatory movement of the valve member between the two positions.

2. The invention as set forth in claim 1 wherein an input filter is disposed between the source of pressurized air and the first and second chambers for minimizing AC pressure fluctuations in the supply line.

3. The invention as set forth in claim 2 wherein said input filter includes filter lines from the supply means to the first and second chambers, which filter lines are substantially equal in length and diameter so that they constitute a filter line connecting between the two chambers, with the supply means including a supply line attached approximately at the midpoint of the interconnected filter lines.

4. The invention as set forth in claim 3 wherein the filter lines connected between the first and second cavities are substantially one-half-wavelength long at the fundamental frequency of the oscillator.

5. The invention as set forth in claim 1 wherein an anvil system is disposed in one of said first and second chambers and is adapted to be periodically impacted upon by the valve member.

6. The invention as set forth in claim 5 wherein the anvil system is included in said second chamber.

7. The invention as set forth in claim 1 wherein said chambers and valve member are configured so as to satisfy the following relationship:

$$\frac{V_A}{V_B} \approx \left(\frac{S_A}{S_B}\right)$$

wherein $V_A$ is the volume of the first chamber, $V_B$ is the volume of the second chamber, $S_A$ and $S_B$ are the areas of the end surfaces of said valve members in said first and second chambers respectively.

8. The invention as set forth in claim 7 wherein the piston area $S_A$ in the first chamber is larger than the piston area $S_B$ in the second chamber so that the area difference $(S_A - S_B)$ multiplied by the maximum working supply pressure $(P_0)_{max}$ is substantially equal to the average force developed by the valve member.

9. The invention as set forth in claim 3 wherein the filter line is sized so that the second harmonic energy conveyed between cavities is 70 percent to 90 percent of the second harmonic energy entering the filter line when the peak first and second cavity pressures are about 1.6 times the average maximum working supply pressure $(P_0)_{max}$.

10. The invention as set forth in claim 1 wherein the housing includes means for supporting the valve member constraining it to movement with a single-degree-of-freedom.

References Cited

UNITED STATES PATENTS

| | | | |
|---|---|---|---|
| 1,164,889 | 12/1915 | Tessmer | 91—234 |
| 1,245,603 | 11/1917 | Lewis | 91—234 |
| 1,855,723 | 4/1932 | Nell | 91—51 |
| 1,861,984 | 6/1932 | Slater | 91—51 |
| 2,585,975 | 2/1952 | Terry | 91—234 |
| 3,118,348 | 1/1964 | Kline | 91—321 |

PAUL E. MASLOUSKY, Primary Examiner

U.S. Cl. X.R.

91—232, 321, 325